(12) United States Patent
Song et al.

(10) Patent No.: US 12,508,115 B2
(45) Date of Patent: Dec. 30, 2025

(54) FIXED BAND BELT SET FOR TREATING AND CARING FOR CAT

(71) Applicants: Seung Chul Song, Yongin-si (KR); Seung A Song, Busan (KR); Hyon Cho, Osan-si (KR)

(72) Inventors: Seung Chul Song, Yongin-si (KR); Seung A Song, Busan (KR); Hyon Cho, Osan-si (KR)

( * ) Notice: Subject to any disclaimer, the term of this patent is extended or adjusted under 35 U.S.C. 154(b) by 0 days.

(21) Appl. No.: 18/478,905

(22) PCT Filed: Aug. 9, 2022

(86) PCT No.: PCT/KR2022/011821
§ 371 (c)(1),
(2) Date: Sep. 29, 2023

(87) PCT Pub. No.: WO2023/120857
PCT Pub. Date: Jun. 29, 2023

(65) Prior Publication Data
US 2025/0073011 A1    Mar. 6, 2025

(30) Foreign Application Priority Data
Dec. 24, 2021  (KR) .................. 10-2021-0187450

(51) Int. Cl.
*A61D 3/00*       (2006.01)
*A01K 15/04*      (2006.01)

(52) U.S. Cl.
CPC ............... *A61D 3/00* (2013.01); *A01K 15/04* (2013.01); *A61D 2003/003* (2013.01); *A61D 2003/006* (2013.01)

(58) Field of Classification Search
CPC .... A01K 15/04; A61D 3/00; A61D 2003/003; A61D 2003/006
See application file for complete search history.

(56) References Cited

U.S. PATENT DOCUMENTS 2,826,172 A  *  3/1958  Buckle .................. A01K 15/04
                                                    D30/152
4,385,592 A  *  5/1983  Goldstein ............... A61D 9/00
                                                    119/815
(Continued)

FOREIGN PATENT DOCUMENTS

CN      211510242 U    9/2020
JP      2009-028379 A  2/2009
(Continued)

OTHER PUBLICATIONS

Office Action issued on Jan. 16, 2025 in the corresponding Russian Patent Application No. 2024115193.

*Primary Examiner* — Michael H Wang
(74) *Attorney, Agent, or Firm* — AJU IP Global PLLC

(57) ABSTRACT

The present invention relates to a fixed band belt set for treating and caring for a cat, with which a veterinarian can easily treat and care for a cat by preventing unexpected accidents occurring when the cat attacks the veterinarian with sharp claws or teeth or touches the equipment due to the cat's mental anxiety during the treatment or care of the cat. The fixed band belt set includes a waist fixed band belt (100) in which a belt body portion (110) having soft hook-and-loop fastener loops (112) formed on one end portion of an outer side thereof and a band winding part (120) having rough hook-and-loop fastener hooks (122) formed on an inner side thereof are integrally formed, two sheets of outer cover fabrics are bonded and sewn, a cut cylindrical plastic prosthesis is inserted between the outer cover fabrics of the belt body portion (110), and a portion of the belt body portion (110) in which the belt body portion (110) and the band winding part (120) of the waist fixed band belt (100) are connected is formed in a shape in which a width is reduced.

1 Claim, 11 Drawing Sheets

(56) References Cited

U.S. PATENT DOCUMENTS

| | | | | |
|---|---|---|---|---|
| 4,489,676 A * | 12/1984 | Colquist | ............ | A61D 9/00 |
| | | | | 119/815 |
| 5,137,508 A * | 8/1992 | Engman | ............ | A61D 9/00 |
| | | | | 602/61 |
| 8,617,091 B2 * | 12/2013 | Brannon | ............ | A61D 9/00 |
| | | | | 602/19 |
| 10,932,894 B2 * | 3/2021 | Luckenbach | ............ | A61D 9/00 |
| 2004/0045512 A1 * | 3/2004 | Goudal | ............ | A01K 15/04 |
| | | | | 119/850 |
| 2010/0059068 A1 | 3/2010 | Groot et al. | | |
| 2021/0059215 A1 * | 3/2021 | Levine | ............ | A61D 3/00 |

FOREIGN PATENT DOCUMENTS

| | | |
|---|---|---|
| JP | 2013-150579 A | 8/2013 |
| JP | 2015-211657 A | 11/2015 |
| RU | 178256 U1 | 3/2018 |
| WO | 2009/020820 A1 | 2/2009 |

* cited by examiner

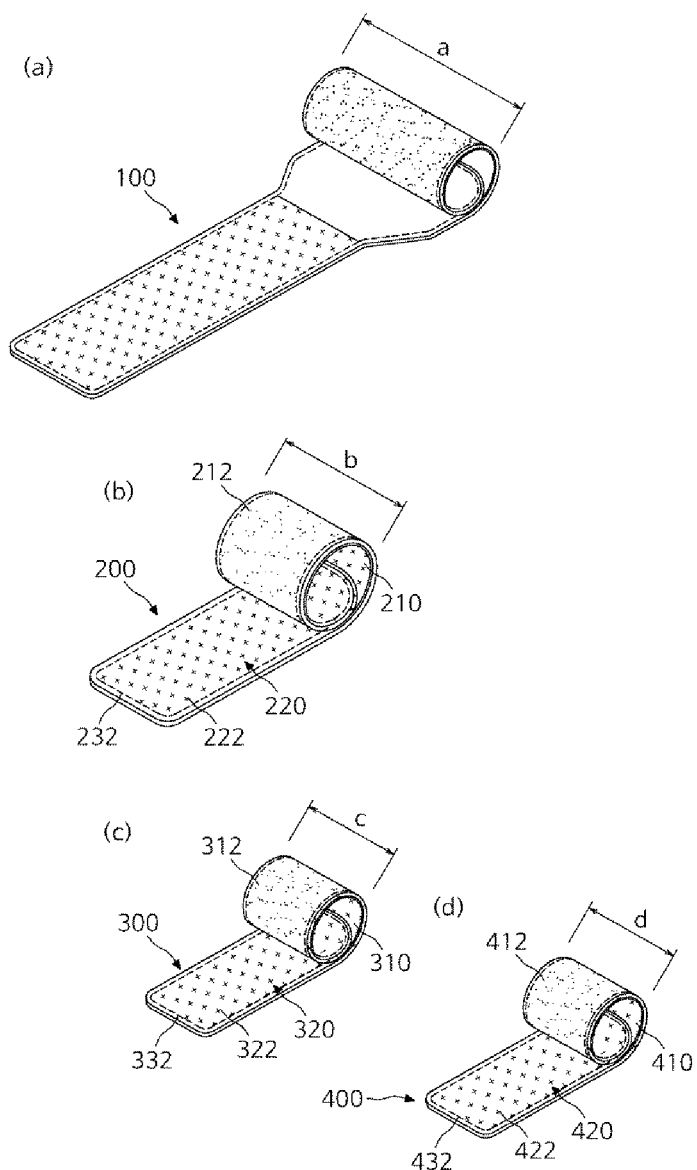

(a)

(b)

FIXED BAND BELT SET FOR TREATING AND CARING FOR CAT

TECHNICAL FIELD

The present invention relates to a fixed band belt set for treating and caring for a cat, and more specifically, to a fixed band belt set for treating and caring for a cat, which allows a veterinarian to easily treat and care for a cat by preventing unexpected accidents caused by the cat attacking the veterinarian with sharp claws or teeth or touching equipment due to mental anxiety of the cat during the cat's treatment or care.

BACKGROUND ART

Cats have very flexible bodies and therefore can scratch their faces with their hind legs and lick their genitals or anuses with their mouths, and can remain safe even after falling from a place several times their height.

Since this flexibility of the body allows sharp teeth and claws to touch people during care, people are easily injured, thereby making the care difficult.

Therefore, conventionally, as a method of overpowering and fixing a cat, a method of covering the cat with a blanket or a pocket has been used, but there has been a disadvantage in that the type of care that may be done in the covered state is extremely limited because most of the body parts other than the face are covered.

Describing the conventional general technology with reference to drawings, FIG. 1 is a view illustrating a comparison between bones of a person's arm in FIG. 1A and bones of a cat's foreleg in FIG. 1B, and FIG. 2 is a schematic diagram of image and motion analysis illustrating a motion state in which a head and shoulders move when a cat walks.

FIGS. 1A and 1B respectively denote an arm bone of a person and a foreleg bone of a cat, reference numerals 11 and 12 (not described) denote parts that are commonly snapped, and the person and the cat comparatively and anatomically have similar aspects.

As illustrated in the drawing, in order to solve this problem that makes cat care difficult, a fixed band belt set for treating and caring for a cat is developed.

As a basic background for this study, first, skeletal anatomy of a cat has been studied, and shapes and positions of bones and joints that induce flexibility of the cat's body are illustrated in a schematic diagram of FIG. 3.

Since a cat's spine is composed of 7 cervical vertebrae, 13 thoracic vertebrae, 7 lumbar vertebrae, 3 sacral vertebrae, and 22 to 23 coccyx vertebrae, a cat's spine has about 20 more bones than a person's spine, thereby enabling much more flexible spinal motion than is possible for a person. In addition, unlike other mammals, since a cat's clavicle is very small in size and is not directly articulated with the scapula and sternum, a cat's clavicle moves independently, thereby doubling flexibility. Based on this flexibility, cats may freely and quickly take desired attitudes, such as excellent leaps and landings, crawling into narrow places, and licking all parts of their bodies. A biting force of a cat is only between 20 and 75 psi, but cats have sharp teeth. Claws are sharp and can be hidden and revealed through contraction and relaxation of ligaments and tendons connected to toe bones (see FIG. 1).

In addition, FIG. 1 is a view illustrating a comparison between bones of a person's arm and bones of a cat's foreleg, and illustrates that the cat performs a clawing motion using a snap of a front ankle like a person who uses a snap of the wrist upon spiking in volleyball.

The cat's clawing motion is done by a series of complex actions including a rotational motion by an acetabular joint of the scapula and the humerus, a hinge motion and a slight rotational motion by a hinge joint of the humerus, the radius, and the ulna, a motion of bending and a motion of slightly rotating by an elliptical joint of the ulna and the ankle bone, and lastly, a motion of folding and unfolding the claws using elastic ligaments positioned between the toe bones together with tendons positioned outside the toe bones and related to folding and unfolding.

In addition, in order to describe the flexibility of the cat's body shown when the cat walks, the cat's body was modeled by performing motion analysis as illustrated in FIG. 2, and FIG. 2 illustrates that when the cat steps forward with a front right leg 1000a, its head turns left while the left shoulder moves up, and when the cat steps forward with a front left leg 1000b, its head turns right while the right shoulder moves up. As described above, it was analyzed that the cat's legs, spine, shoulders, and neck parts were connected to show a continuous wave phenomenon.

Reference numeral 1000 (not described) denotes a cat's body.

In the case of dogs, this movement seemed to be very minor, and phenomena shown specifically in cats were that 1) the number of vertebrae was large (person: 33, cat: 53), and 2) each clavicle was in a floating state independently because it was articulated with other joints and connected to muscles (ligaments) rather than being fixed.

Technical Problem

As described above, the present invention is directed to safely treating and caring for a cat by developing a fixed band belt set for treating and caring for a cat to block the cat's aggression against threat.

The present invention is also directed to providing a structure that allows a cat to lie down comfortably (without movement) by allowing a fixed band belt to be fastened to front portions of bones of the hind legs based on a belly portion of a cat's body.

In addition, the present invention is also directed to providing a structure at a neck part that prevents a cat from attacking with teeth for self-defense.

In addition, the present invention is also directed to providing a structure at an ankle part that prevents a cat from attacking with claws for self-defense.

The present invention is also directed to studying a material capable of making a cat comfortable by being easily unfolded so that a prosthesis inserted into a belt body applied to the fastening belt may be wound around the cat's body and being returned to an original state without being damaged.

In addition, the present invention is also directed to providing a structure in which joint parts of a cat are quickly wound and fixed by a prosthesis or fixing ring inserted into a fixed band and returns to an original state after use, thereby making the cat comfortable.

Technical Solution

The present invention provides a fixed band belt set for treating and caring for a cat, including a waist fixed band belt (100) in which a belt body portion (110) having soft hook-and-loop fastener loops (112) formed on one end portion of an outer side thereof and a band winding part (120) having rough hook-and-loop fastener hooks (122) formed on an inner side thereof are integrally formed, two sheets of outer cover fabrics are bonded and sewn, and a cut cylindrical plastic prosthesis is inserted between the outer cover fabrics of the belt body portion (110), wherein a portion of the belt body portion (110) in which the belt body portion (110) and the band winding part (120) of the waist fixed band belt (100) are connected is formed in a shape in which a width is reduced, and the waist fixed band belt covers a cat's lumbar vertebrae to act on a lumbosacral joint (1150) formed from the lumbar vertebrae (1140) of the cat's waist part to a rump and is positioned close to front side surfaces of thighs of hind legs.

In addition, the present invention provides a fixed band belt set for treating and caring for a cat, including a neck fixed band belt (200) in which a belt body portion (210) having soft hook-and-loop fastener loops (212) formed on one end portion of an outer side thereof and a band winding part (220) having rough hook-and-loop fastener hooks (222) formed on an inner side thereof are integrally formed, two sheets of fabrics are bonded and sewn between outer cover fabrics of the belt body portion (210), and a cut cylindrical plastic prosthesis is inserted between the outer cover fabrics of the belt body portion (210), wherein the belt body portion (210) and the band winding part (220) of the neck fixed band belt (200) are formed in a straight shape having the same width, and the neck fixed band belt (200) covers a cat's lumbar vertebrae and is positioned close to a lower surface of the mandible.

In addition, the present invention provides a fixed band belt set for treating and caring for a cat, including: an ankle fixed band belt (300) in which a belt body portion (310) having soft hook-and-loop fastener loops (312) formed on one end portion of an outer side thereof and a band winding part (320) having rough hook-and-loop fastener hooks (322) formed on an inner side thereof are integrally formed, two sheets of fabrics are bonded and sewn between outer cover fabrics of the belt body portion (310), and a cut cylindrical plastic prosthesis is inserted between the outer cover fabrics of the belt body portion (310), wherein the belt body portion (310) and the band winding part (320) of the ankle fixed band belt (300) are formed in a straight shape having the same width, and the ankle fixed band belt (300) covers ankle joints (1180) of left and right forelegs.

In addition, in the present invention, the fixed band (100a) of the waist fixed band belt (100) may include a polycarbonate resin, and the fixed band (100a) of the waist fixed band belt (100) may have a tensile strength of 600 kgf/cm$^2$ or more measured based on the ASTM D 638 standard, and a flexural strength of 800 kgf/cm$^2$ or more and a flexural modulus of 20,000 kgf/cm$^2$ or more measured based on the ASTM D 790 standard.

In addition, in the present invention, one or more fixed bands (100b) (100c) among of neck and ankle fixed band belts (200) (300) may include a polyamide 66 resin, and the one or more fixed bands (100b) (100c) of the neck and ankle fixed band belts (200) (300) may have a tensile strength of 1,500 kgf/cm$^2$ or more measured based on the ASTM D 638 standard, a tensile elongation of 4% or more, and a flexural strength of 2,500 kgf/cm$^2$ or more and a flexural modulus of 80,000 kgf/cm$^2$ or more measured based on the ASTM D 790 standard.

In addition, the present invention provides a method of fastening a fixed band belt for treating and caring for a cat, including: first, fastening a waist fixed band belt (100) in which a belt body portion (110) having soft hook-and-loop fastener loops (112) formed on one end portion of an outer side thereof and a band winding part (120) having rough hook-and-loop fastener hooks (122) formed on an inner side thereof are integrally formed, two sheets of outer cover fabrics are bonded and sewn, and a plastic prosthesis is inserted between the outer cover fabrics of the belt body portion (110), according to a size of the cat's body; then, fastening a neck fixed band belt (200) in which a belt body portion (210) having soft hook-and-loop fastener loops (212) formed on one end portion of an outer side thereof and a band winding part (220) having rough hook-and-loop fastener hooks (222) formed on an inner side thereof are integrally formed, two sheets of outer cover fabrics are bonded and sewn, and a plastic prosthesis is inserted between the outer cover fabrics of the belt body portion (210), according to a size of the cat's neck; and then, fastening an ankle fixed band belt (300) in which a belt body portion (310) having soft hook-and-loop fastener loops (312) formed on one end portion of an outer side thereof and a band winding part (320) having rough hook-and-loop fastener hooks (322) formed on an inner side thereof are integrally formed, two sheets of outer cover fabrics are bonded and sewn, and a plastic prosthesis is inserted between the outer cover fabrics of the belt body portion (310), according to a size of the cat's ankle.

In addition, the present invention provides a fixed band belt set for treating and caring for a cat, including: a waist fixed band belt (100) in which a belt body portion (110) having soft hook-and-loop fastener loops (112) formed on one end portion of an outer side thereof and a band winding part (120) having rough hook-and-loop fastener hooks (122) formed on an inner side thereof are integrally formed, two sheets of outer cover fabrics are bonded and sewn, and a cut cylindrical plastic prosthesis is inserted between the outer cover fabrics of the belt body portion (110), wherein a portion of the belt body portion (110) in which the belt body portion (110) and the band winding part (120) of the waist fixed band belt (100) are connected is formed in a shape in which a width is reduced, the waist fixed band belt covers the cat's lumbar vertebrae to act on a lumbosacral joint (1150) formed from lumbar vertebrae (1140) of the cat's waist part to a rump and is positioned close to front side surfaces of thighs of hind legs, an anti-attachment member stopper (502) of an anti-attachment member (500) is wound as an intermediate separator when the waist fixed band belt (100) is wound by being fitted between the belt body portion end (123) and the hook-and-loop fastener hooks (122) of the waist fixed band belt (100), and the anti-attachment member (500) is formed to have a shorter length than the waist fixed band belt (100) to form a gap (d), and thus a space for allowing the hook-and-loop fastener hooks (122) of the band winding part (120) to be bonded to the hook-and-loop fastener loops (112) of the belt body portion (110) is formed in the gap (d).

In addition, the present invention provides a fixed band belt set for treating and caring for a cat in which an ankle fixing ring body (610) of an ankle fixing ring (600) for pets has an "Ω (omega)" shape, and a fitting part (612) formed in an open portion of a rounding part (611) is formed to be opened to make the ankle fixing ring easily fit on an ankle.

In addition, the present invention provides a fixed band belt set for treating and caring for a cat, wherein an ankle fixing ring (600) for pets includes an ankle fixing ring body (610) and two slipping prevention parts (620), the ankle fixing ring body (610) has an "Ω (omega)" shape, and a fitting part (612) formed in an open portion of a rounding part (611) is formed to be opened to make the ankle fixing ring easily fit on an ankle, slipping prevention part seating grooves (613) in which the slipping prevention parts (620) are fitted into and seated on both sides of the ankle fixing ring body (610) are formed, the slipping prevention parts (620) are made of a silicone material and formed of a hollow rectangular fitting part cylinder (621) having a fitting space (622) formed therein as a through hole to fit the ankle fixing ring body (610), and slipping prevention protrusions (623) for preventing slipping after the ankle fixing ring is fitted on the ankle are formed.

Advantageous Effects

Therefore, according to the present invention, since a cat's waist, neck, and ankles are fastened by fixed band belts for treating and caring to block the cat's aggression against threat, it is possible to prevent the cat from arbitrarily moving, and thus safely treat and care for the cat.

In order to provide a structure that allows a cat to lie down comfortably (without movement) by allowing fixed band belts to fasten to front portions of bones of the hind legs based on a belly portion of the cat's body, a waist fixed band belt covers the cat's lumbar vertebrae to act on a lumbosacral joint 1150 formed from lumbar vertebrae 1140 of the cat's waist part to its rump and is positioned close to front side surfaces of the thighs of the hind legs, and thus when the cat steps forward with a hind leg to run away, a front portion of the thigh is caught on an edge of a solid belt to momentarily cause it to lose balance of its body and fall by itself, thereby making the cat behave gently (comfortably).

In addition, in order to provide a structure at a neck part that can prevent a cat from attacking with teeth for self-defense, a neck fixed band belt 200 covers between the skull-cervical vertebra joint 1110 and the cervical vertebra-thoracic vertebra joint 1130 and is positioned close to a lower surface of the mandible, and thus the cat cannot bite with its teeth by opening its mouth through the mandible joint 1170, and an operating range and speed of its head are restricted.

In addition, in order to provide a structure at an ankle part that can prevent a cat from attacking with claws for self-defense, ankle fixed band belts 300 and 400 cover ankle joints 1180 of the left and right forelegs, thereby making the cat behave gently.

An outer packaging of a belt itself made of the above-described fabric prevents injury of thighs caused by touch due to an impact or friction or the like according to the cat's sudden movement or the like.

It is possible to make a cat behave gently with a material capable of making the cat comfortable by being easily unfolded so that a prosthesis inserted into a belt body applied to the fastening belt may be wound around the cat's body and returned to an original state without being damaged.

In addition, a neoprene material can be applied to cover fabrics wound around an exterior of a plastic prosthesis, thereby decreasing a step difference between plastic and fabrics due to deformation of the plastic prosthesis, and this is because it is possible to reduce slipping because the neoprene has good elasticity and a rubber material is attached to a lower portion thereof.

In addition, a soft and thick rubber material can reduce a pressure applied when an edge of a body of a fixed band belt touches the cat's bone, and in particular, a hook-and-loop fastener material is added to the entire surface of outer surface fabrics, thereby enabling adhesion with a hook-and-loop fastener of a winding part.

DESCRIPTION OF DRAWINGS

FIGS. 7A, 7B, 7C, and 7D are overall schematic perspective views of fixed band belts for the waist, neck, and ankles of the cat according to the present invention.

BEST MODE

Figure 1:
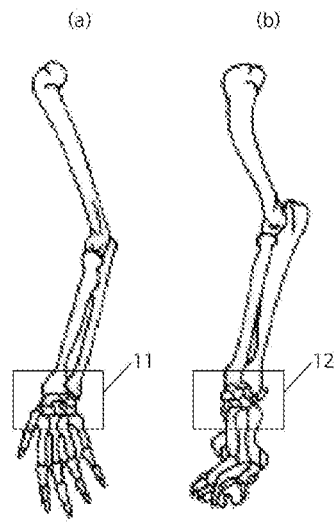
FIG. 1 is a view illustrating a comparison between bones of a person's arm in FIG. 1A and bones of a cat's foreleg in FIG. 1B.
Figure 2:
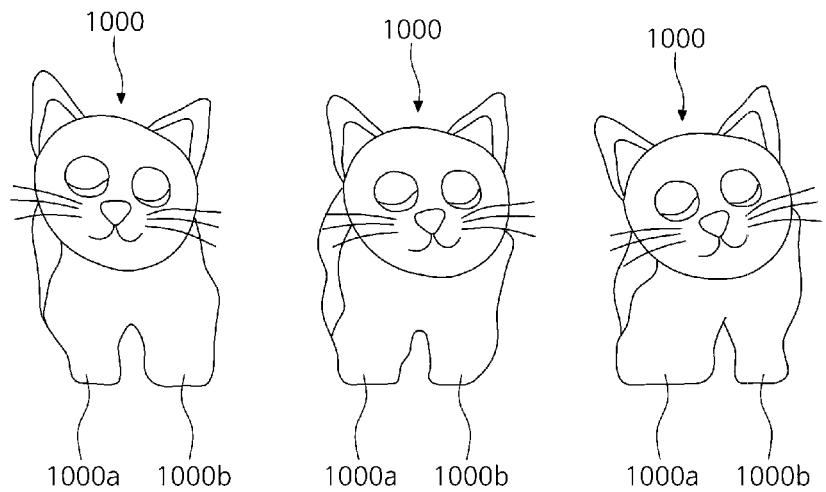
FIG. 2 is a schematic diagram of image and motion analysis illustrating a motion state in which a head and shoulders move when the cat walks.

Embodiments of the present invention may be modified in various forms, and the scope of the present invention should not be construed as being limited to the following embodiments. The embodiments are provided to more completely describe the present invention to those skilled in the art. Therefore, shapes of components and the like in the drawings are exaggerated to emphasize a clearer description.

Figure 3A:
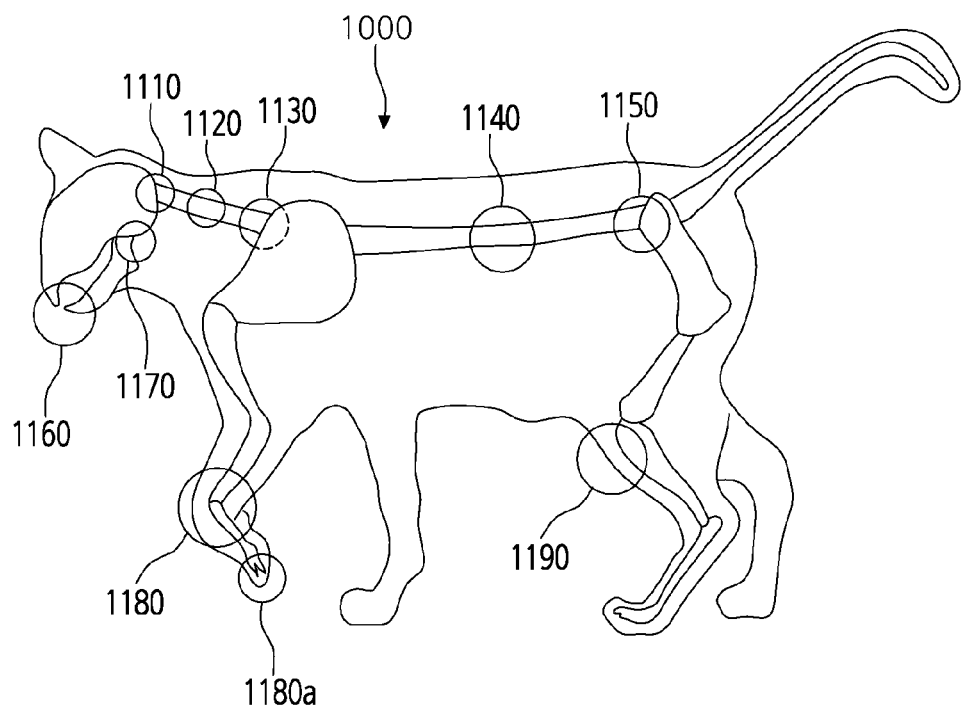
FIGS. 3A and 3B are a schematic diagram illustrating movement prevention parts of a cat according to the present invention during treatment and care and a detailed view illustrating a structure of a bone.
Figure 3B:
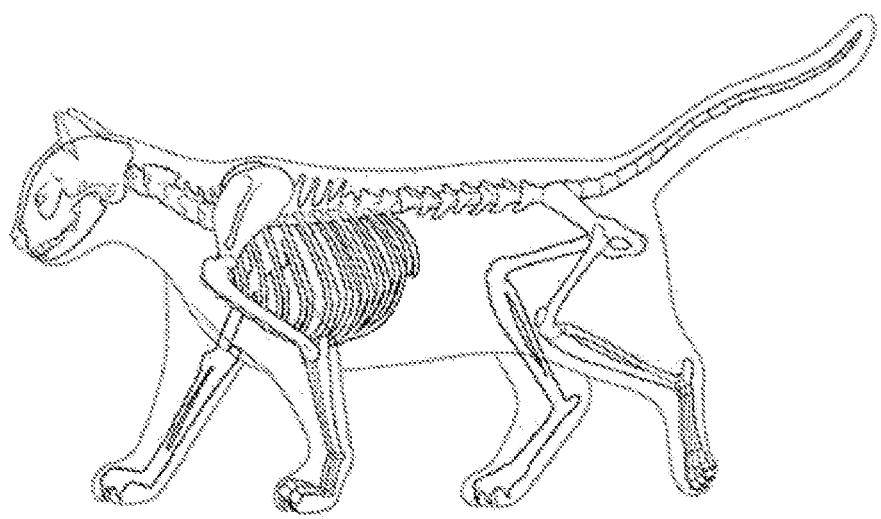
Figure 4:
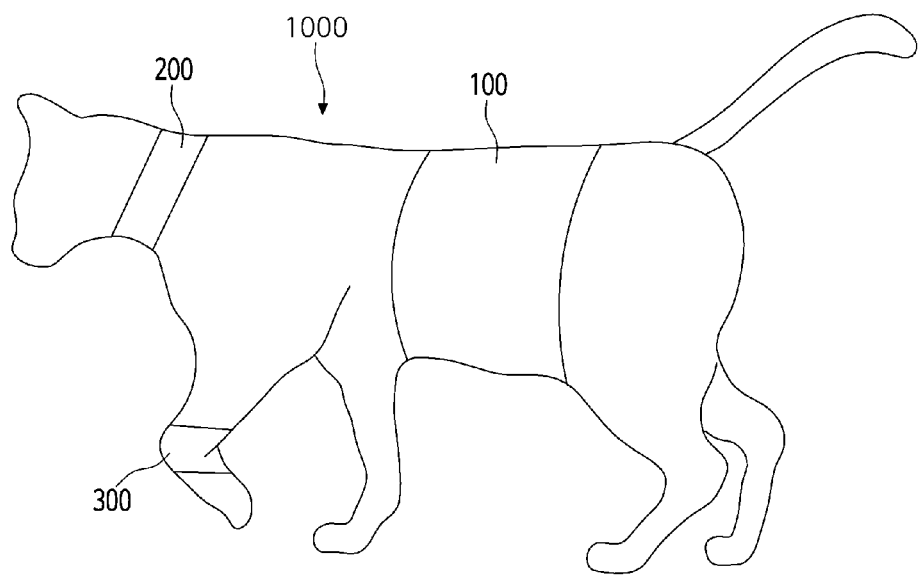
FIG. 4 is a view illustrating that a band is fixed to the movement prevention parts of the cat according to the present invention during treatment and care.

FIGS. 3A and 3B are a schematic diagram illustrating movement prevention parts of the cat according to the present invention during treatment and care and a detailed view illustrating a structure of a bone, and FIG. 4 is a view illustrating that a band is fixed to the movement prevention parts of the cat according to the present invention during treatment and care.

Figure 5:
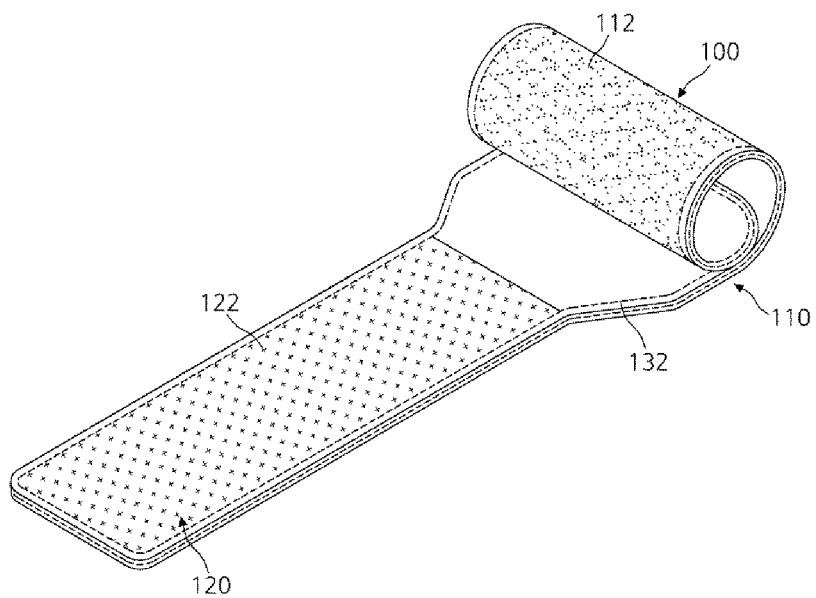
FIG. 5 is a schematic perspective view of a waist fixed band for a cat according to the present invention.
Figure 6A:
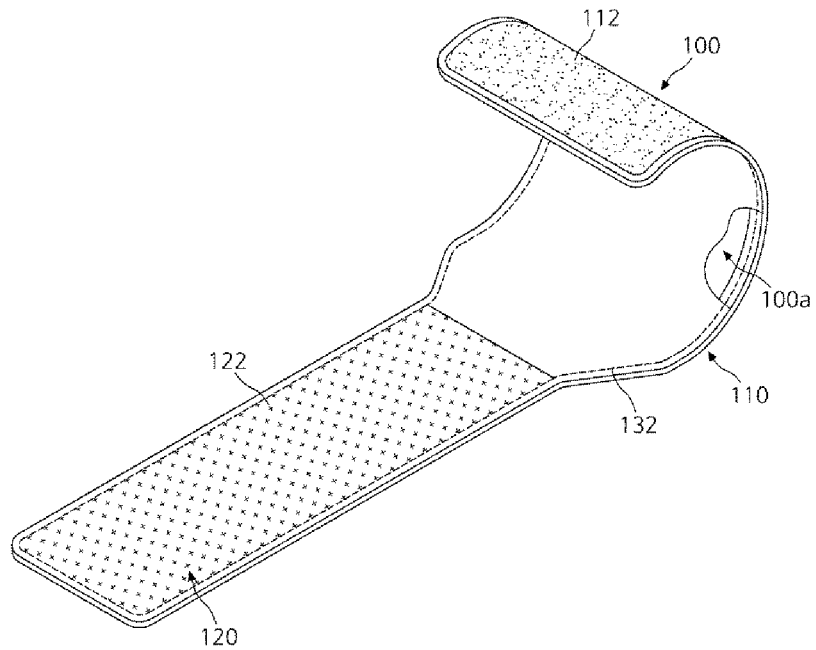
FIGS. 6A and 6B are schematic perspective views illustrating positions of hook-and-loop fasteners of the waist fixed band for a cat according to the present invention.
Figure 6B:
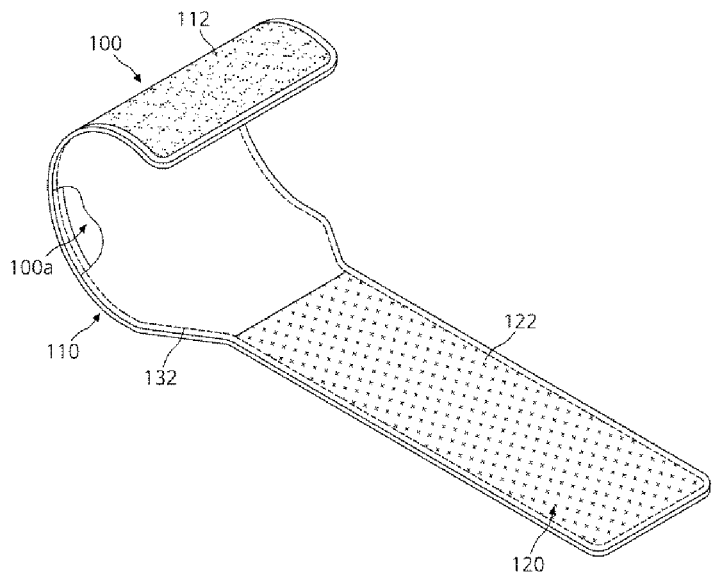
Figure 8:
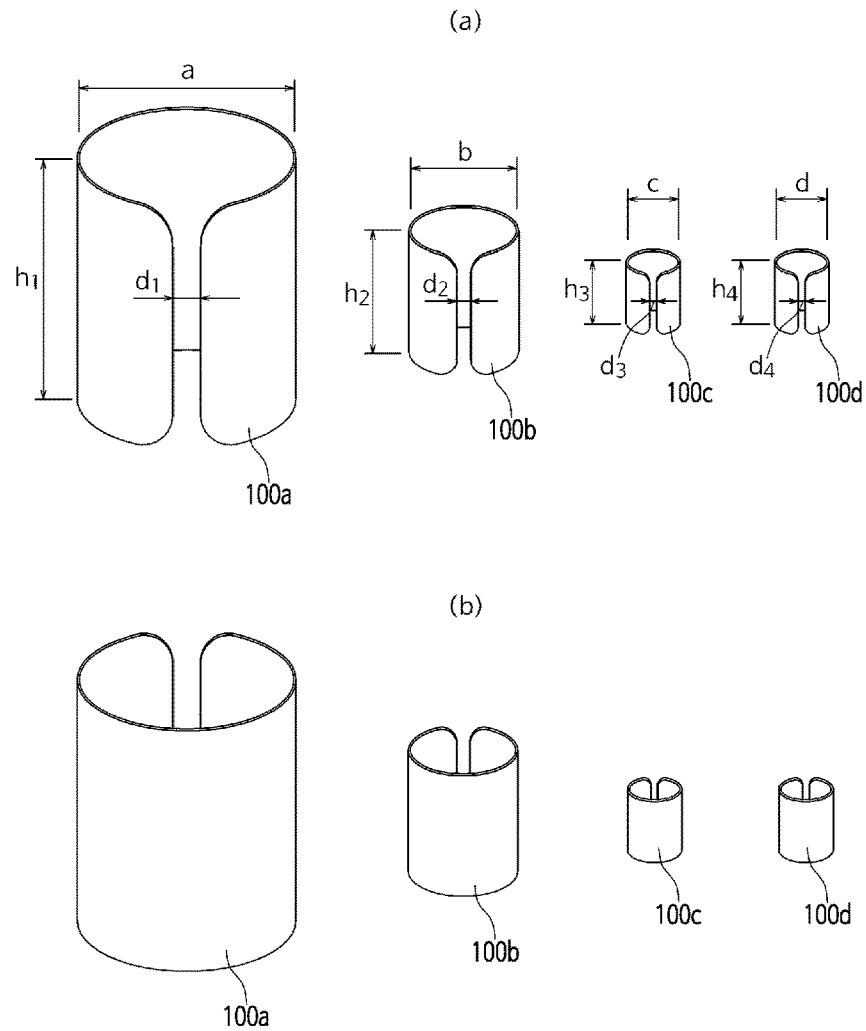
FIGS. 8A and 8B are front and rear perspective views of a plastic prosthesis inserted into bodies of the fixed band belts for the waist, the neck, and the ankles of the cat according to the present invention.

In addition, FIG. 5 is a schematic perspective view of a waist fixed band for a cat according to the present invention, FIGS. 6A and 6B are schematic perspective views illustrating positions of hook-and-loop fasteners of the waist fixed band for a cat according to the present invention, FIGS. 7A, 7B, 7C, and 7D are overall schematic perspective views of fixed band belts of the waist, neck, and ankles of the cat according to the present invention, and FIGS. 8A and 8B are front and rear perspective views of a plastic prosthesis inserted into bodies of the fixed band belts of the waist, the neck, and the ankles of the cat according to the present invention.

Figure 9:
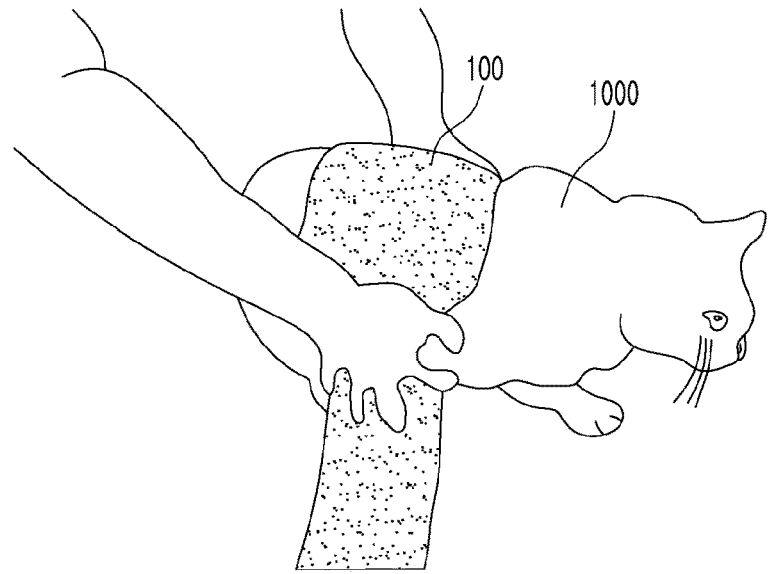
FIG. 9 is a view illustrating that the waist fixed band belt according to the present invention is fastened to the cat.
Figure 10:
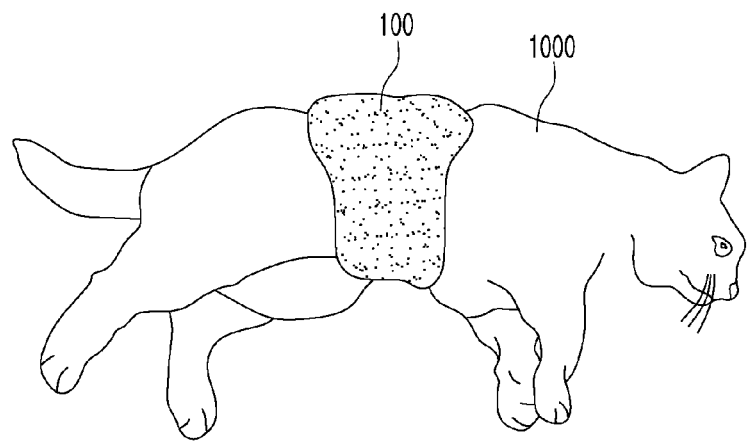
FIG. 10 is a view illustrating a state in which a cat falls by itself and enters a fixed state in the state in which the waist fixed band belt according to the present invention is fastened to the cat.
Figure 11:
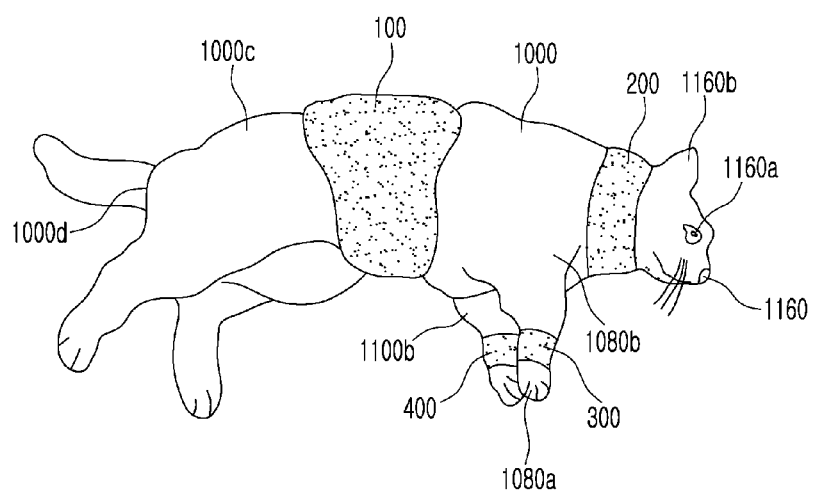
FIG. 11 is a view illustrating exposed portions on which treatment and care are performed in a state in which a cat does not move in a state in which the fixed bands of the waist, the neck, and two ankles of the cat according to the present invention are fastened.
Figure 12:
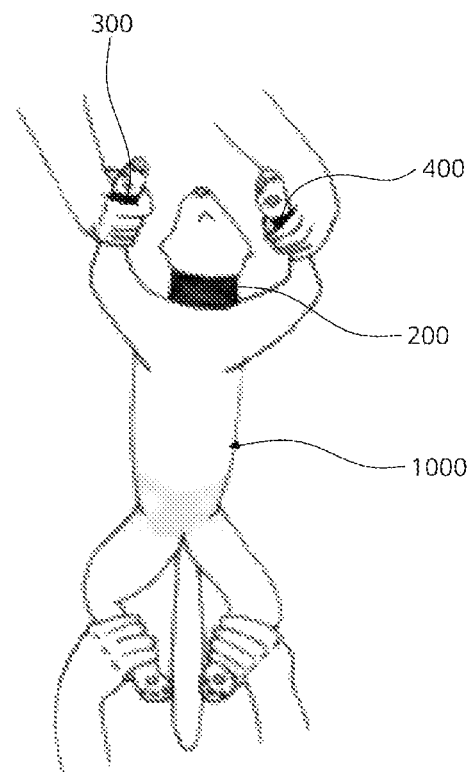
FIG. 12 is a schematic perspective view illustrating a state in which a thoracic abdomen is examined in a state in which the waist fixed band for a cat is detached and only the neck and ankle fixed bands thereof are fastened according to the present invention.

In addition, FIG. 9 is a view illustrating that the waist fixed band belt according to the present invention is fastened to the cat, FIG. 10 is a view illustrating a state in which a cat falls by itself and enters a fixed state in the state in which the waist fixed band belt according to the present invention is fastened to the cat, FIG. 11 is a view illustrating exposed portions on which treatment and care are performed in a state in which the cat does not move in the state in which fixed bands of the waist, the neck, and two ankles of the cat according to the present invention are fastened, and FIG. 12 is a schematic perspective view illustrating a state in which a thoracic abdomen is examined in a state in which the waist fixed band for a cat is detached and only the neck and ankle fixed bands thereof are fastened according to the present invention.

A waist fixed band belt 100 should cover a cat's lumbar vertebrae and be positioned close to front surfaces of the thighs of the hind legs.

A neck fixed band belt 200 should cover the cat's cervical vertebrae and be positioned close to a lower surface of the mandible.

Ankle fixed band belts 300 and 400 should cover ankle joints of the left and right forelegs.

As illustrated in FIGS. 7A and 7B, schematically describing components of the fixed band belt set for treating and caring for a cat according to the present invention, the waist fixed band belt 100, the neck fixed band belt 200, and the ankle fixed band belt 300 are provided.

As illustrated in a schematic diagram of the skeletons of a cat's body 1000, in order to move the head, a skull-cervical vertebra joint 1110 is formed in the head part, and a cervical vertebra-thoracic vertebra joint 1130 connected to a cervical vertebra 1120 is formed in the head part.

In addition, a lumbosacral joint 1150 is formed from lumbar vertebrae 1140 of the cat's waist part to its rump.

In addition, sharp teeth 1160 are formed in the muzzle of the head part, and a joint 1170 is formed between the skull and the mandible.

In addition, ankle joints 1180 are formed in the foreleg part of the cat's body 1000, and sharp claws 1180a are formed on the foot thereunder.

In addition, thigh front portions 1190 are formed on the hind leg part of the cat's body 1000 and formed of a rump bone and a joint.

It was analyzed that the cervical vertebra 1120 part, the lumbar vertebrae 1140, and the ankle joints 1180 acted as a driving force for attack and avoidance based on flexibility of a cat's motion.

In the present invention, it could be analyzed that the cat used both teeth and claws as weapons, and where the joints for overpowering this were positioned.

Therefore, a treatment and care method of preventing the cat from moving using each of the waist fixed band belt 100, the neck fixed band belt 200, and the ankle fixed band belts 300 and 400 for fixing the cervical vertebra 1120 part, the lumbar vertebrae 1140, and the ankle joints 1180 was analyzed.

A detailed description of the above-described components is as follows.

The waist fixed band belt 100 includes a belt body portion 110 in which soft hook-and-loop fastener loops 112 formed on one end portion of an outer side thereof and a band winding part 120 having rough hook-and-loop fastener hooks 122 formed on an inner side thereof are integrally formed, two sheets of outer cover fabrics are bonded and sewn, two sheets of fabrics are bonded and sewn between the outer cover fabrics of the belt body portion 110 part, and a cut cylindrical plastic prosthesis is inserted between the outer cover fabrics of the belt body portion 110 part.

The belt body portion 110 of a portion in which the belt body portion 110 and the band winding part 120 of the waist fixed band belt 100 are connected is formed in a shape in which a width is reduced.

The cat's waist is positioned inside the belt body portion 110, and the waist fixed band belt 100 is fastened to the waist by the rough hook-and-loop fastener hooks 122 of the band winding part 120 wound around the cat's waist and attached to the soft hook-and-loop fastener loops 112 of the belt body portion 110.

It was analyzed that the hook-and-loop fastener hooks 122 attached to the hook-and-loop fastener of the belt body portion 110 of the waist fixed band belt 100 were strongly attached to a general type hook-and-loop fastener, and it was analyzed that it was sufficient to prevent the cat's sudden defensive behavior.

That is, in the case of using an injection type hook-and-loop fastener, it was analyzed that there was a problem in that an adhesive strength was too good so that it was difficult to attach or detach the belt wound around the cat, and this was because it was analyzed as a result in which, since uneven portions of the hook-and-loop fastener were more than half smaller than those of the general type hook-and-loop fastener, the uneven portions became smaller when the cat's hair was caught, resulting in reducing the adhesive strength.

The neck fixed band belt 200 includes a belt body portion 210 in which soft hook-and-loop fastener loops 212 formed on one end portion of an outer side thereof and a band winding part 220 having rough hook-and-loop fastener hooks 222 formed on an inner side thereof are integrally formed, two sheets of outer cover fabrics are bonded and sewn, two sheets of fabrics are bonded and sewn between the outer cover fabrics of the belt body portion 210 part, and a cut cylindrical plastic prosthesis is inserted between the outer cover fabrics of the belt body portion 210 part.

The belt body portion 210 of a portion in which the belt body portion 210 and the band winding part 220 of the neck fixed band belt 200 are connected is formed in a straight shape having the same width.

The neck is positioned inside the belt body portion 210, and the neck fixed band belt 200 is fastened to the neck by the rough hook-and-loop fastener hooks 222 of the band winding part 220 wound around the cat's neck and attached to the soft hook-and-loop fastener loops 212 of the belt body portion 210.

It was analyzed that the rough hook-and-loop fastener hooks 222 of the winding part attached to the hook-and-loop fastener of the belt body portion 210 of the neck fixed band belt 200 were strongly attached to a general type hook-and-loop fastener, and it was analyzed that it was sufficient to prevent the cat's sudden defensive behavior.

That is, in the case of using an injection type hook-and-loop fastener, it was analyzed that there was a problem in that an adhesive strength was so good that it was difficult to attach or detach the belt wound around the cat, and this was because it was analyzed as a result in which, since uneven portions of the hook-and-loop fastener were more than half smaller than those of the general type hook-and-loop fastener, the uneven portions became smaller when the cat's hair was caught, resulting in reducing the adhesive strength.

The ankle fixed band belts 300 and 400 include a belt body portion 310 in which soft hook-and-loop fastener loops 312 formed on one end portion of an outer side thereof and a band winding part 320 having rough hook-and-loop fastener hooks 322 formed on an inner side thereof are integrally formed, and two sheets of outer cover fabrics are bonded and sewn, two sheets of fabrics are bonded and sewn between the outer cover fabrics of the belt body portion 310 part, and a cut cylindrical plastic prosthesis is inserted between the outer cover fabrics of the belt body portion 310 part.

The belt body portion 310 of a portion in which the belt body portion 310 and the band winding part 320 of the ankle fixed band belt 300 are connected is formed in a straight shape having the same width.

The ankle is positioned inside the belt body portion 310, and the ankle fixed band belt 300 is fastened to the ankle by the rough hook-and-loop fastener hooks 322 of the band winding part 320 wound around the cat's ankle and attached to the soft hook-and-loop fastener loops 312 of the belt body portion 310.

It was analyzed that the rough hook-and-loop fastener hooks 322 attached to the hook-and-loop fastener of the belt body portion 310 of the ankle fixed band belt 300 were strongly attached to a general type hook-and-loop fastener, and it was analyzed that it was sufficient to prevent the cat's sudden defensive behavior.

That is, in the case of using an injection type hook-and-loop fastener, it was analyzed that there was a problem in that an adhesive strength was so good that it was difficult to attach or detach the belt wound around the cat, and this was because it was analyzed as a result in which, since uneven portions of the hook-and-loop fastener were more than half smaller than those of the general type hook-and-loop fastener, the uneven portions became smaller when the cat's hair was caught, resulting in reducing the adhesive strength.

It was analyzed that the waist fixed band belt 100 was effective only when an edge of the band was worn to be maximally in close contact with the thigh front portions.

In addition, it was analyzed that the neck fixed band belt 200 was effective only when an edge of the band was in close contact with the lower end portion of the mandible.

In addition, it was analyzed that the ankle fixed band belts 300 and 400 were effective only when joint parts between the lumbar vertebra-ulna and metacarpal bones of the forelegs were wound.

In particular, gentle cats may be cared for with only the waist fixed band belt, but ferocious cats should wear all fixed belts on the waist, the neck, and the ankles.

Next, the fixed band of the present invention will be described in detail.

FIG. 5 is a schematic perspective view of a waist fixed band for a cat according to the present invention, FIGS. 6A and 6B are schematic perspective views illustrating positions of hook-and-loop fasteners of the waist fixed band for a cat according to the present invention, FIGS. 7A, 7B, 7C, and 7D are overall schematic perspective views of fixed band belts of the waist, neck, and ankles of the cat according to the present invention, and FIGS. 8A and 8B are front and rear perspective views of a plastic prosthesis inserted into bodies of the fixed bands of the waist, the neck, and the ankles of the cat according to the present invention.

As illustrated in FIGS. 5 to 8, the belt body portion 110 of the waist fixed band belt 100 is formed in a size a to cover about half of the waist including the back part according to a size of the cat's waist, the belt body portion 210 of the neck fixed band belt 200 is formed in a size b according to a size of the cat's neck, and the belt body portion 310 of the ankle fixed band belt 300 is formed in sizes c and d according to sizes of the ankles.

In the cat's lumbar vertebrae, each bone is continuously joined by spinal discs, accessory muscles, and ligaments and serves as a central axis for balancing the body.

In addition, the sacral vertebrae, which are a part of the spine, are articulated with a sacrum, and the sacrum is articulated with a femur.

Therefore, when mobility of the femur is restricted by an edge surface of the waist fixed band belt, mobility of the overall processes from the sacrum to the lumbar vertebrae are distorted. Subsequently, even when the cat attempts to balance its body through the flexible lumbar vertebrae, the mobility of the lumbar vertebrae is restricted by a section of a rigid band, thereby causing the cat to fall down.

Therefore, the waist fixed band belt 100 includes the belt body portion 110 in which the soft hook-and-loop fastener loops 112 formed on one end portion of an outer side thereof and the band winding part 120 having the rough hook-and-loop fastener hooks 122 formed on an inner side thereof are integrally formed, two sheets of outer cover fabrics are bonded and sewn to form a seam 132, and a cut cylindrical plastic fixed band 100a is inserted between the outer cover fabrics of the belt body portion 110 and inserted therebetween by making a diameter a of the fixed band 100a of 7.5 cm, having a reasonable margin of about 0.5 cm, making a height h1 of 13 cm, and having a reasonable margin of about 1 cm.

In addition, the belt body portion 110 of the portion in which the belt body portion 110 and the band winding part 120 of the waist fixed band belt 100 are connected is formed in a shape in which a width is reduced, and the reduction in the width of the winding part of the waist belt is for securing a larger area of the abdomen on which abdominal examination or care can be performed.

Since the cat's skull is articulated with the cervical vertebrae and also articulated with the mandible, all of operating ranges of the neck, the head, and the muzzle are restricted when the mobility of the mandible is restricted, and the cat may not perform an operation of quickly turning or tilting its head and opening its muzzle, and thus it is difficult to take actions of biting with the teeth or avoiding interference. Therefore, the neck fixed band belt 200 includes the belt body portion 210 in which the soft hook-and-loop fastener loops 212 formed on one end portion of an outer side thereof and the band winding part 220 having the rough hook-and-loop fastener hooks 222 formed on an inner side thereof are integrally formed, two sheets of outer cover fabrics are bonded and sewn to form a seam 232, and a cut cylindrical plastic fixed band 100*b* is inserted between the outer cover fabrics of the belt body portion 210 and inserted therebetween by making a diameter b of the fixed band 100*b* of 7 cm, having a reasonable margin of about 0.5 cm, making a height h2 of 2.5 cm, and having a reasonable margin of about 0.5 cm.

The cat's clawing motion is done by a series of complex actions of a rotational motion by the acetabular joint of the scapula and the humerus, a hinge motion and a slight rotational motion by a hinge joint of the humerus, the radius, and the ulna, a bending motion and a slight rotational motion by an elliptical joint of the ulna and the ankle bone, and lastly, and a motion of folding and unfolding the claws using elastic ligaments positioned between the toe bones together with tendons positioned outside the toe bones and related to folding and unfolding.

Therefore, when the ankle band is applied to the joint part of the radius and the ankle bone, since the entire leg may be moved but a motion of bending the ankle is not possible, a range and speed of the clawing motion are extremely restricted.

Therefore, the ankle fixed band belt 300 includes the belt body portion 310 in which the soft hook-and-loop fastener loops 312 formed on one end portion of an outer side thereof and the band winding part 320 having the rough hook-and-loop fastener hooks 322 formed on an inner side thereof are integrally formed, two sheets of outer cover fabrics are bonded and sewn to form a seam 332, and a cut cylindrical plastic fixed band 100*c* is inserted between outer cover fabrics of the belt body portion 310 and inserted therebetween by making a diameter c of the fixed band 100*c* of 2.5 cm, having a reasonable margin of about 0.5 cm, making a height h3 of 2 cm, and having a reasonable margin of about 0.5 cm.

It was analyzed that cut cylindrical cutout parts d1, d2, and d3 served to adjust a degree of slightly tightening the cat's body according to the size of the cat's body when the band winding parts were fixedly wound, and the cut cylindrical cutout parts d1, d2, and d3 were appropriately 0.5 cm, 0.3 cm, and 0.2 cm, respectively.

In addition, it was analyzed that the band winding parts 120, 220, and 330 served to adjust a degree of slightly tightening the cat's body according to the size of the cat's body when the band winding parts were fixedly wound, and the band winding parts 120, 220, and 330 were appropriately 36 cm, 11 cm, and 8 cm, respectively.

The belt body portion 110 and the band winding part 120 of the waist fixed band belt 100 are formed in a shape in which the width is reduced, the belt body portion 210 and the band winding part 220 of the neck fixed band belt 200 are formed in a straight shape having the same width, the belt body portion 310 of the portion in which the belt body portion 310 and the band winding part 320 of the ankle fixed band belt 300 are connected is also formed in a straight shape having the same width, and as a standard, it is preferable that the belt body portion 110 of the waist fixed band belt 100 be formed in the size of the diameter a to cover about half the waist including the back part according to the size of the cat's waist, the belt body portion 210 of the neck fixed band belt 200 be formed in the size of the diameter b according to the size of the cat's neck, and the belt body portion 310 of the ankle fixed band belt 300 be formed in the sizes of the diameters c and d according to the sizes of the ankles.

The reason why widths of the winding parts of the neck belt and the ankle belt do not decrease is because these two belts are so small that the area of the hook-and-loop fastener also becomes smaller, and thus the width should not decrease to secure even a little more area.

Next, a state of treating and caring for a cat will be described.

FIG. 9 is a view illustrating that the waist fixed band belt according to the present invention is fastened to the cat, FIG. 10 is a view illustrating a state in which a cat falls by itself and enters a fixed state in the state in which the waist fixed band belt according to the present invention is fastened to the cat, FIG. 11 is a view illustrating exposed portions on which treatment and care are performed in a state in which the cat does not move in a state in which fixed bands of the waist, neck, and two ankles of the cat are fastened to the cat, and FIG. 12 is a schematic perspective view illustrating a state in which a thoracic abdomen is examined in a state in which the waist fixed band for a cat is detached and only the neck and ankle fixed bands thereof are fastened according to the present invention.

In FIG. 9, a state in which the waist fixed band belt according to the present invention is fastened to the cat is illustrated, and a state in which the waist fixed band belt 100 is wound above the waist to prevent the cat from biting or clawing is illustrated.

In FIG. 10, a state in which the cat falls and is fixed to the waist fixed band belt 100 in a state in which the waist fixed band belt 100 according to the present invention is fastened to the cat is illustrated.

In FIG. 11, an image of exposed portions, on which treatment and care are performed in a state in which the cat does not move in a state in which all of the waist fixed band belt 100, the neck fixed band belt 200, and the ankle fixed band belts 300 and 400 of the cat according to the present invention are fastened, is illustrated.

Reference number 1100*b* (not described) denotes an inside of an upper arm part of the foreleg, reference numeral 1000*c* denotes a thigh part of the hind leg, and reference numeral 1000*d* denotes an anus part. In addition, reference numeral 1160 denotes the cat's muzzle, reference numeral 1160*a* denotes the cat's pupil, reference numeral 1160*b* denotes the cat's ear, reference numeral 1180*a* denotes the claws, and reference numeral 1180*b* denotes the chest.

In FIG. 12, a state in which X-ray or ultrasound examination for the thoracic abdomen may be conducted in a state in which only the waist fixed band belt 100 is detached and only the neck fixed band belt 200 and the ankle fixed band belts 300 and 400 are fastened is illustrated.

As described above, according to the number of cases in which the fixed band belts are combined, the number of types of available treatment and care may further increase.

Next, examples of the types of treatment or care that are possible in a state in which the bands are fastened will be described.

Eye examination and eye drop administration may be performed on the eyes, ear examination, ear cleaning, and drug administration may be performed on the ears, oral examination, tooth brushing, and drug administration may be performed on the oral cavity, claw clipping may be performed on the feet, blood collection and blood pressure measurement may be performed on the forelegs, auscultation, X-ray, and ultrasound examination may be performed on the thoracic abdomen, a syringe may be used for injection into the thigh part, a subcutaneous fluid may be injected into a dorsal subcutaneous region with a syringe, and anus cyst examination and body temperature measurement through the rectum may be performed on the anus.

As described above, since these parts are exposed in a fixed state, the above listed treatment or care is immediately possible with anesthesia or without a person being injured or applying an excessive grip strength to the cat, and these are things that are desperately needed in the field.

Next, a method of fastening the fixed band belt for treating and caring for a cat will be described.

The method of fastening the fixed band belt for treating and caring for a cat includes, first, fastening the waist fixed band belt 100 in which the belt body portion 110 having the soft hook-and-loop fastener loops 112 formed on one end portion of an outer side thereof and the band winding part 120 having the rough hook-and-loop fastener hooks 122 formed on an inner side thereof are integrally formed, two sheets of outer cover fabrics are bonded and sewn, and the plastic prosthesis is inserted between the outer cover fabrics of the belt body portion 110 part, according to the size of the cat's body, fastening the neck fixed band belt 200 in which the belt body portion 210 having the soft hook-and-loop fastener loops 212 formed on one end portion of an outer side thereof and the band winding part 220 having the rough hook-and-loop fastener hooks 222 formed on an inner side thereof are integrally formed, two sheets of outer cover fabrics are bonded and sewn, and the plastic prosthesis is inserted between the outer cover fabrics of the belt body portion 210 part, according to the size of the cat's neck, and then, fastening the ankle fixed band belt 300 in which the belt body portion 310 having the soft hook-and-loop fastener loops 312 formed on one end portion of an outer side thereof and the band winding part 320 having the rough hook-and-loop fastener hooks 322 formed on an inner side thereof are integrally formed, two sheets of outer cover fabrics are bonded and sewn, and the plastic prosthesis is inserted between the outer cover fabrics of the belt body portion 310 part, according to the size of the cat's ankle.

It was found during treatment that in the method of fastening the fixed band belt for treating and caring for a cat, the waist part was the best part for overpowering the cat by preventing the entire body of the cat from moving.

Then, it was found during treatment that the neck part was a part for overpowering the cat by preventing the entire face from moving so that the cat could not use its teeth.

Then, it was found during treatment that the ankle part was a part for overpowering the cat by preventing the entire ankle from moving so that the cat could not use its claws.

It was confirmed that by performing treatment and care in this order, the cat became gentle and it was possible to prevent movement during treatment or care.

When the order was changed and the fixed band was fastened from the ankle, a case of standing up using a waist force or biting with teeth occurred, and when the order was changed and the fixed band was fastened from the neck, a case of standing up using the waist force or clawing with claws occurred.

As described above, the reason why a thick and elastic material such as neoprene is applied to the outer cover fabric of the band, and the outer cover fabric of the band sufficiently secures a cross-sectional area in an internal plastic to cover is that it is possible to endure a tensile force due to deformation of the internal plastic, reduce a pressure applied to the edges of the bones, and prevent the fabrics from getting wet with administration of drugs because the outer cover fabric is a waterproof material.

Next, a material and physical properties of the fixed band will be described.

The fixed band 100a of the waist fixed band belt 100 may include a polycarbonate resin. Since heat resistance, bending resistance, and mechanical strength are excellent when the polycarbonate resin is included, it is possible to prevent damage such as breakage or cracking of the fixed band even when the cat's waist is bent.

The fixed band 100a of the waist fixed band belt 100 may have a tensile strength of 600 kgf/cm$^2$ or more measured based on the ASTM D 638 standard, and a flexural strength of 800 kgf/cm$^2$ or more and a flexural modulus of 20,000 kgf/cm$^2$ or more measured based on the ASTM D 790 standard. Under the above conditions, since the bending resistance, the tensile strength, and the mechanical strength of the fixed band 100a are excellent, the waist fixed band belt 100 may be suitable for use for fixing the cat's waist. For example, the fixed band 100a of the waist fixed band belt 100 may have a tensile strength of 600 to 850 kgf/cm$^2$ measured based on the ASTM D 638 standard, and a flexural strength of 800 to 1,100 kgf/cm$^2$ and a flexural modulus of 20,000 to 26,000 kgf/cm$^2$ measured based on the ASTM D 790 standard.

For example, the fixed band 100a of the waist fixed band belt 100 may have a shrinkage (based on a specimen in a thickness of 3 mm) of 1.0% or less measured according to the ASTM D 955 standard, a melt index (300° C., 1.2 kg) of 10 g/10 min or more measured based on the ASTM D 1238 standard, and a heat deflection temperature (HDT) (based on 1.82 MPa (18.6 kgf/cm$^2$) measurement) of 120° C. or higher measured based on the ASTM D 648 standard. Under the above conditions, since processability, bending resistance, tensile strength, and mechanical strength are excellent, the waist fixed band belt 100 may be suitable for use for fixing the cat's waist. For example, the fixed band 100a may have a shrinkage (based on a specimen in a thickness of 3 mm) of 0.5 to 0.7% measured based on the ASTM D 955 standard, a melt index (300° C., 1.2 kg) of 10 to 18 g/10 min measured based on the ASTM D 1238 standard, and a heat deflection temperature (HDT) (based on 1.82 MPa (18.6 kgf/cm$^2$) measurement) of 120 to 140° C. measured based on the ASTM D 648 standard.

In one specific example, the fixed bands 100b and 100c of the neck and ankle fixed band belts 200 and 300 may include a polyamide 66 resin. When this material is included, bending resistance and mechanical strength can be excellent when the neck and ankle fixed bands are bent.

One or more fixed bands 100b and 100c of the neck and ankle fixed band belts 200 and 300 may have a tensile strength of 1,500 kgf/cm$^2$ or more measured based on the ASTM D 638 standard, a tensile elongation of 4% or more, and a flexural strength of 2,500 kgf/cm$^2$ or more and a flexural modulus of 80,000 kgf/cm$^2$ or more measured based on the ASTM D 790 standard. Under the above conditions, since bending resistance and mechanical properties are excellent, the neck and ankle fixed band belts 200 and 300 may be suitable for use for fixing the cat's neck and ankle parts. For example, one or more fixed bands 100b and 100c of the neck and ankle fixed band belts 200 and 300 may have a tensile strength of 1,500 to 2,200 kgf/cm$^2$ measured based on the ASTM D 638 standard, a tensile elongation of 4 to 10%, and a flexural strength of 2,500 to 3,500 kgf/cm$^2$ and a flexural modulus of 80,000 to 95,000 kgf/cm$^2$ measured based on the ASTM D 790 standard.

For example, one or more fixed bands 100*b* and 100*c* of the neck and ankle fixed band belts 200 and 300 may have a shrinkage (based on a specimen in a thickness of 3 mm) of 1.0% or less measured based on the ASTM D 955 standard, a melting point of 220° C. or higher measured based on the ASTM D 1525 standard, and a heat deflection temperature (HDT/A) (based on 1.82 MPa (18.6 kgf/cm$^2$) measurement) of 230° C. or higher measured based on the ASTM D 648 standard. Under the above conditions, bending resistance at a high temperature can be excellent, and dimensional stability, heat resistance, and processability can be excellent. For example, the fixed bands 100*b* and 100*c* may have a shrinkage of 0.3 to 0.7%, a melting point of 220 to 270° C., and a heat deflection temperature of 230 to 250° C.

As another example, one or more fixed bands 100*b* and 100*c* of the neck and ankle fixed band belts 200 and 300 may further include reinforcing fibers. When the reinforcing fibers are further included, the tensile strength and the bending resistance of the fixed band can be improved. For example, the reinforcing fiber may include a glass fiber.

In one specific example, one or more fixed bands 100*b* and 100*c* of the neck and ankle fixed band belts 200 and 300 may include 50 to 95 wt % of a polyamide 66 resin and 5 to 50 wt % of reinforcing fibers. When the polyamide 66 resin and the reinforcing fibers are included in the above range, mixability and dispersibility can be excellent, the tensile strength and the flexural strength of the fixed band can be further increased, and bending properties at a high temperature can be excellent.

Hereinafter, the configuration and operation of the present invention will be described in more detail through preferred embodiments of the present invention. However, these are suggested as preferred examples of the present invention and may not be construed as limiting the present invention thereby in any sense. Since content not described herein may be technically inferred by those skilled in the art, description thereof will be omitted.

Next, the waist fixed band for pets to which a hook-and-loop fastener anti-attachment member is coupled will be described.

Figure 13:
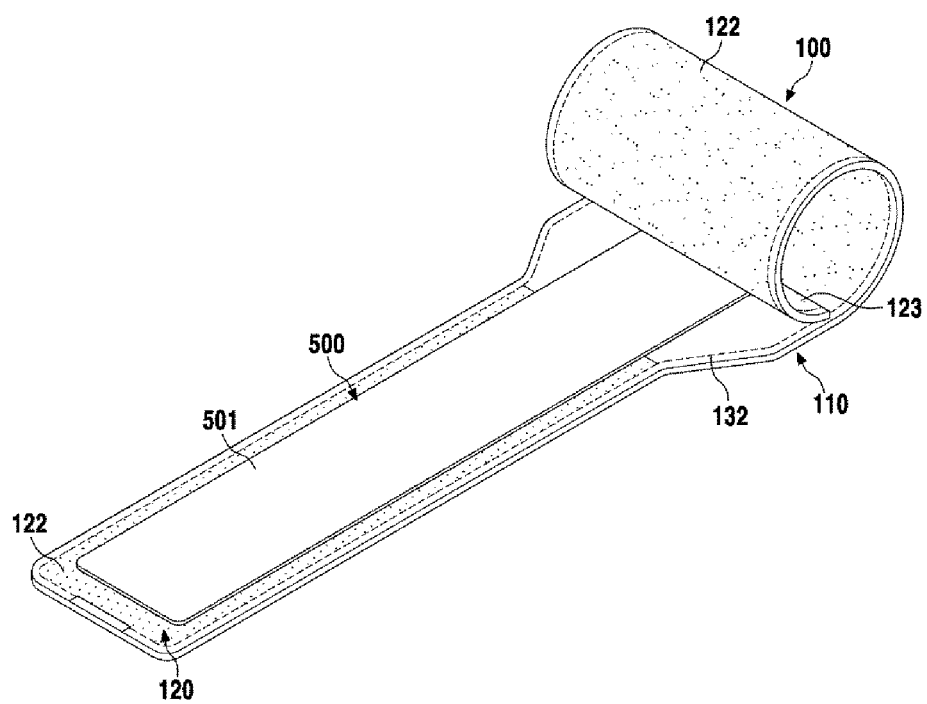
FIG. 13 is a schematic perspective view illustrating the waist fixed band for a cat according to the present invention to which a hook-and-loop fastener anti-attachment member is coupled.
Figure 14:
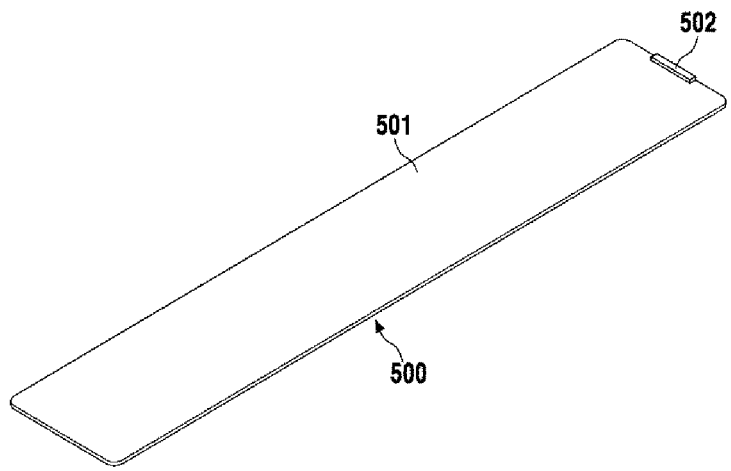
FIG. 14 is a schematic perspective view illustrating the hook-and-loop fastener anti-attachment member of the waist fixed band for a cat according to the present invention.
Figure 15:
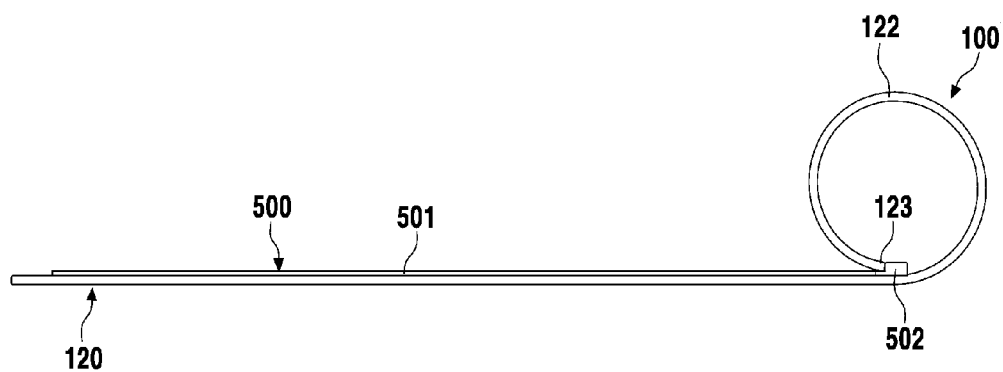
FIG. 15 is a schematic side view illustrating the waist fixed band for a cat according to the present invention to which the hook-and-loop fastener anti-attachment member is coupled.
Figure 16:
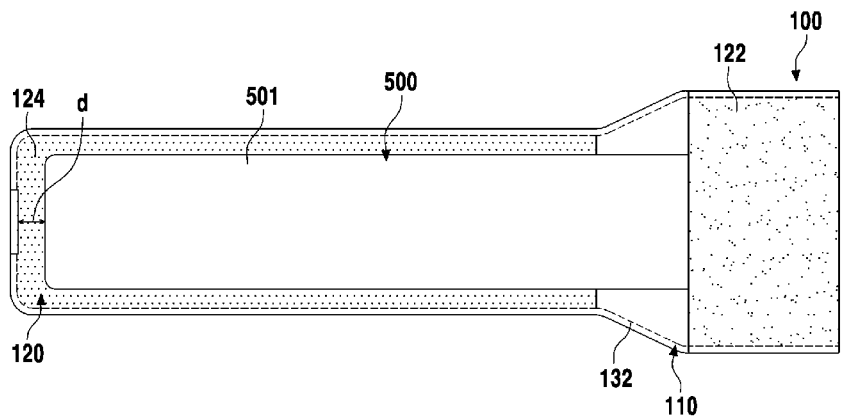
FIG. 16 is a schematic plan view illustrating the waist fixed band for a cat according to the present invention to which the hook-and-loop fastener anti-attachment member is coupled.
Figure 17:
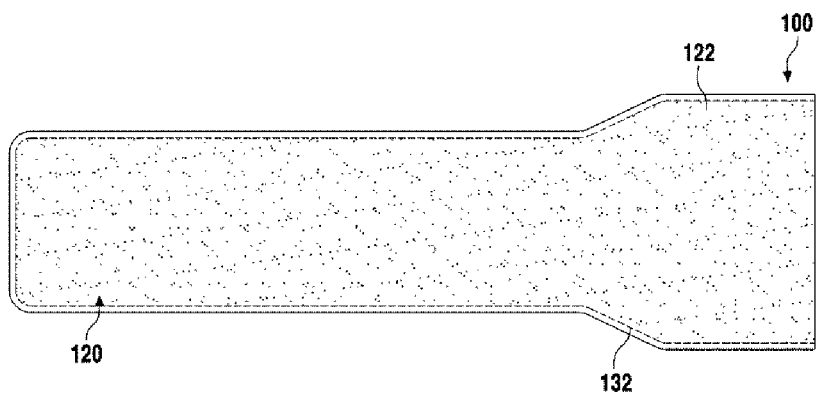
FIG. 17 is a schematic rear view illustrating the waist fixed band for a cat according to the present invention to which the hook-and-loop fastener anti-attachment member is coupled.

FIG. 13 is a schematic perspective view illustrating the waist fixed band for a cat according to the present invention to which a hook-and-loop fastener anti-attachment member is coupled, FIG. 14 is a schematic perspective view illustrating the hook-and-loop fastener anti-attachment member of the waist fixed band for a cat according to the present invention, FIG. 15 is a schematic side view illustrating the waist fixed band for a cat according to the present invention to which the hook-and-loop fastener anti-attachment member is coupled, FIG. 16 is a schematic plan view illustrating the waist fixed band for a cat according to the present invention to which the hook-and-loop fastener anti-attachment member is coupled, and FIG. 17 is a schematic rear view illustrating the waist fixed band for a cat according to the present invention to which the hook-and-loop fastener anti-attachment member is coupled.

As another embodiment of the present invention, materials of the waist fixed band and the hook-and-loop fastener anti-attachment member include a synthetic fiber and a synthetic resin.

Another embodiment of the present invention discloses a structure in which, in order to prevent a veterinarian or an owner from being injured by attack of the pet during treatment and care for the pet such as a dog or a cat and reduce pressure directly applied to the pet's body by a person's grip strength, the pet's body is quickly and fixedly wound by the attitude fixed band of the pet in which the hook-and-loop fastener hooks 122 are formed at an inner side thereof at a predetermined portion and the hook-and-loop fastener loops 112 are entirely formed at an outer side thereof.

As illustrated in FIG. 13, in order to prevent the pet from being surprised by sounds of the fixed hook-and-loop fastener loops and hooks 112 and 122 when the fixed band is wound around the pet's body and unwound, an anti-attachment member 500 for covering the hook-and-loop fastener hooks formed on the upper portion of the attitude fixed band is used by being coupled to the upper portion of the attitude fixed band for pets, and the fixed band is used to roll up by fixing a clip part attached to an end of the anti-attachment member to an edge of the fixed band.

Therefore, the waist fixed band belt 100 includes the belt body portion 110 in which the soft hook-and-loop fastener loops 112 formed on one end portion of an outer side thereof and the band winding part 120 having the rough hook-and-loop fastener hooks 122 formed on an inner side thereof are integrally formed, two sheets of outer cover fabrics are bonded and sewn to form the seam 132, and the cut cylindrical plastic fixed band 100*a* is inserted between the outer cover fabrics of the belt body portion 110 part (see FIG. 6A).

In addition, the belt body portion 110 of the portion in which the belt body portion 110 and the band winding part 120 of the waist fixed band belt 100 are connected is formed in a shape in which a width is reduced, in which the reduction in the width of the winding part of the waist belt is for securing a larger area of the abdomen for abdominal examination or care, and as the belt body portion 110 of the waist fixed band belt 100 is wound in a round shape by the internal plastic fixed band 100*a*, a wound belt body portion end 123 of the belt body portion 110 is in contact with the hook-and-loop fastener hooks 122.

Here, when the waist fixed band belt 100 is wound and then unwound, a sound of hearing loss (like a squeak) is generated which may sound threatening to the pet, and in order to prevent this, an anti-attachment member stopper 502 of the anti-attachment member 500, which is made of a polyethylene (PE) material, may be used as an intermediate separator by being fitted between the belt body portion end 123 and the hook-and-loop fastener hooks 122, thereby removing the sound.

That is, the anti-attachment member 500 used when the waist fixed band belt 100 is stored by being rolled up is formed to have a smaller width than the waist fixed band belt 100 and formed to have a shorter length than the waist fixed band belt 100, and after the waist fixed band belt 100 is completely wound, the anti-attachment member 500 is formed to have a shorter length than the waist fixed band belt 100 to form a gap d, and thus a space for allowing the hook-and-loop fastener hooks 122 of the band winding part 120 to be bonded to the hook-and-loop fastener loops 112 of the belt body portion 110 is formed in the gap d.

Therefore, after the anti-attachment member stopper 502 of the anti-attachment member 500, which is made of the PE material, is fitted between the belt body portion end 123 and the hook-and-loop fastener hooks 122 to completely wind the waist fixed band belt 100, since the hook-and-loop fastener hooks 122 of the band winding part 120 are bonded to the hook-and-loop fastener loops 112 of the belt body portion 110 by the extra hook-and-loop fastener hooks 122 formed in the gap d, even when the hook-and-loop fastener loops and hooks 112 and 122 are released, an adhesive strength is blocked by the anti-attachment member 500, and thus the hook-and-loop fastener loops and hooks 112 and 122 may be released without making any sound, thereby preventing the pet from being startled.

Next, an ankle fixing ring for pets according to the present invention will be described.

Figure 18:
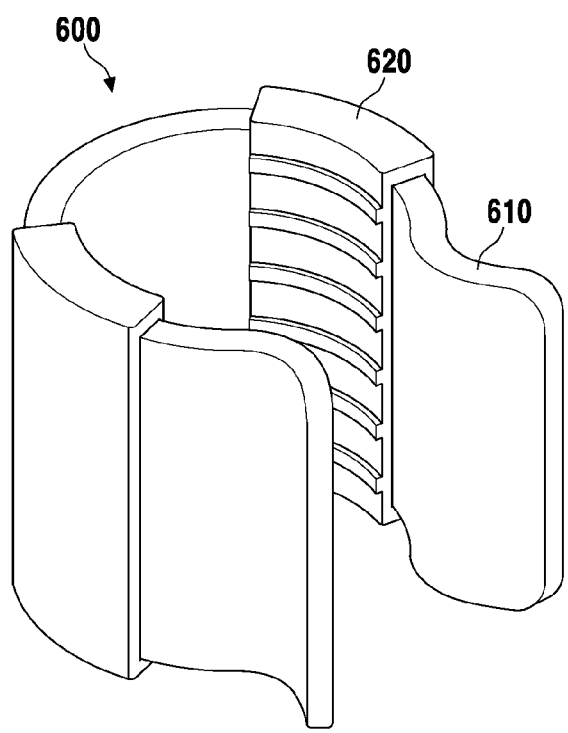
FIG. 18 is a schematic perspective view of an ankle fixing ring for a cat according to the present invention.
Figure 19:
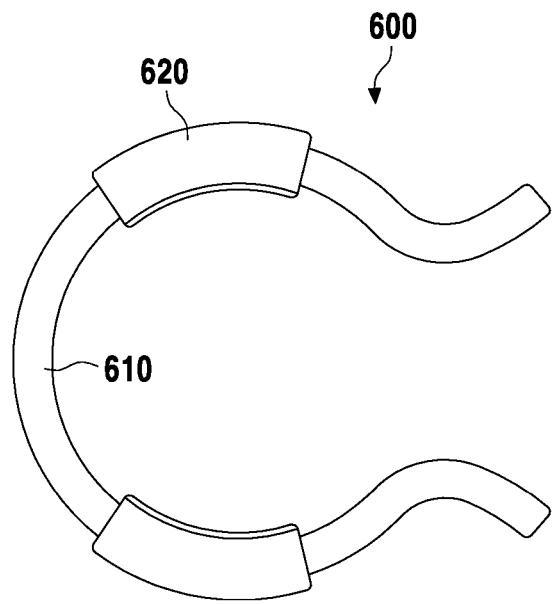
FIG. 19 is a schematic plan view of the ankle fixing ring for a cat according to the present invention.
Figure 20:
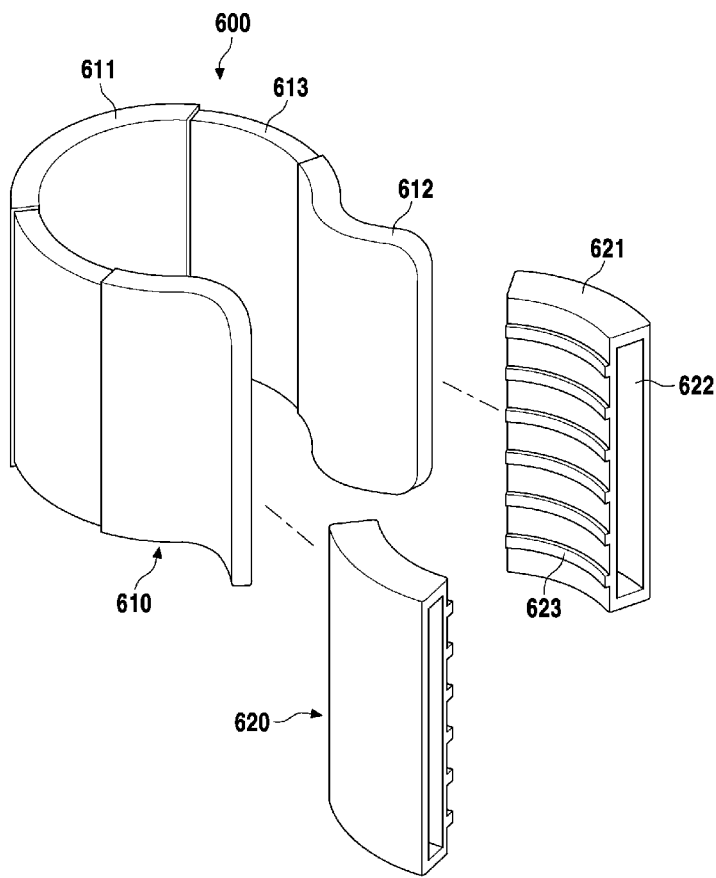
FIG. 20 is a schematic perspective view of the ankle fixing ring for a cat according to the present invention.

FIG. 18 is a schematic perspective view of an ankle fixing ring for a cat according to the present invention, FIG. 19 is a schematic plan view of the ankle fixing ring for a cat according to the present invention, and FIG. 20 is a schematic perspective view of the ankle fixing ring for a cat according to the present invention.

Materials that can be used for the ankle fixing ring for pets include a synthetic resin and a silicone material.

The ankle fixing ring for pets according to the present invention has a structure a structure in which, in order to prevent a veterinarian or an owner from being injured by attack of the pet during treatment and care for the pet such as a dog or a cat and reduce pressure directly applied to the pet's body by a person's grip strength, the pet's ankle is quickly and fixedly wound by the ankle fixing ring for pets.

Next, the ankle fixing ring for pets according to the present invention will be described in detail.

As illustrated in FIGS. 18 to 20, an ankle fixing ring body 610 of an ankle fixing ring 600 for pets is made of a plastic material having appropriate stiffness and restoring force, and two slipping prevention parts 620 fitted into the ankle fixing ring body 610 are made of a silicone material and have uneven portions 623 formed thereon toward a contact surface of the ankle, thereby preventing the ankle fixing ring from being separated from the ankle.

When the ankle is fixed in a band form like the waist and the neck, there is a problem in that ① the fixing effect is low because an attachment area of the hook-and-loop fastener is too small, ② it is inconvenient because an operation of accurately wearing the band on the ankle joint part after lifting the leg and then having to turning once and winding the band is performed on a small foreleg joint of the cat, and ③ fabrics are contaminated and cleaning is not easy when blood splashes and sticks to the fabrics of the fixed band upon collecting blood from the foreleg part.

As a feature of such an ankle fixed band, not only does the clawing operation become impossible because the foreleg ankle joint may not be bent, but also the cat may not stand up by itself to run away even with the waist band detached and only the ankle fixed band attached, an omega structure of the ring and the uneven portions carved on a silicone clip doubly prevent the fixing ring from being separated from the cat's ankle, a polyoxymethylene (POM) (acetal) material having both excellent stiffness and restoring force is used, the ankle fixed band is seated on a point that is caught while lifting after being roughly fitted around a lower side of the ankle, and the ring is fitted directly from the side without having to lift the leg.

In addition, there is an advantage of using a plastic material of which cleaning is easy even when blood splashes and sticks when blood is collected through the foreleg.

As described above, the ankle fixing ring body 610 has the "Ω (omega)" shape, a fitting part 612 formed in an open portion of a rounding part 611 is formed to be opened to make an ankle easily fit therein, and slipping prevention part seating grooves 613 are formed as grooves for determining positions of the slipping prevention part 620 fitted into and seated on both sides of the ankle fixing ring body 610 or preventing the movement of the slipping prevention parts 620.

Therefore, the slipping prevention part 620 may be pushed in from a side surface of the ankle, the pet is not injured in a pushing-in process, and it can be easy to fit the slipping prevention part 620 by gripping the leg with the hand.

The slipping prevention part 620 is made of a silicone material and formed of a hollow rectangular fitting part cylinder 621, and has a fitting space 622 formed therein as a through hole to fit the ankle fixing ring body 610, and slipping prevention protrusions 623 are formed to prevent the slipping caused by the pet's hair after the ankle is fitted.

Therefore, the body of the ankle fixing ring for pets is made of a plastic material having appropriate stiffness and restoring force, and the two slipping prevention parts fitted into the body have the uneven portions formed thereon toward the contact surface of the ankle, thereby preventing slipping while avoiding excessive pressure and thus preventing the ankle fixing ring from being separated from the ankle.

The slipping prevention part 620, which is the silicone clip of the ankle ring, buffers a pressure applied to the ankle with silicone, is manufactured of silicone having various thicknesses, and may be fixed to the cat's ankles having various diameters by unifying sizes of internal grooves so that all of the slipping prevention parts 620 may be attached to one ankle ring body.

Commonly, this is because the silicone is first in actual contact with the ankle because the silicone protrudes more than the plastic when the ankle ring is applied to the ankle.

Since cats have sensitive personalities and have very developed hearing, the cats may hear noises and run away in a process of releasing the attachment between the hook-and-loop fasteners to release the waist fixed band from a stored state. Therefore, it is possible to minimize the attached portions between the hook-and-loop fasteners, thereby minimizing attachment and detachment noises, and an end portion of the hook-and-loop fastener of the winding part is slightly exposed to roll up and store the fixed band even in a state in which the anti-attachment member is added to the fixed band. In addition, the hook-and-loop fastener anti-attachment member is added on the band winding part, and the protrusion attached to the end of an attachment member is inserted into and fixedly caught on an inner side of an edge of the band cylinder, thereby making it easy to roll up.

Next, an image inspection that is possible in a state in which the ankle fixing ring 600 for pets is attached will be described.

According to the drawings, image inspection such as X-ray or magnetic resonance imaging (MRI) is performed by moving the cat to an image inspection site and laying the cat down while it wears the waist fixed band and the neck fixed band and then fastening the ankle fixing rings to the ankles of the left and right forelegs, and thereafter, taking a desired attitude with one or two among the fixed bands of the waist and the neck detached according to necessary inspection portions.

Even in a state in which only the ankle fixing rings are fastened, the cat may not stand up by itself to run away, and the ankle fixing rings do not interfere with the image inspection because all of the ankle fixing rings are made of a non-metallic material.

That is, it is possible to perform the inspection immediately with them attached.

Although the configuration and operation of the fixed band belt set for treating and caring for a cat according to the present invention have been described above with reference to the detailed description and the drawings, this is merely an example, and various changes and modifications are possible without departing from the technical spirit of the present invention.

MODES OF THE INVENTION

Embodiment 1

There is provided a fixed band belt for treating and caring for a cat including the waist fixed band belt 100 in which the belt body portion 110 having the soft hook-and-loop fastener loops 112 formed on one end portion of an outer side thereof and the band winding part 120 having the rough hook-and-loop fastener hooks 122 formed on an inner side thereof are integrally formed, two sheets of outer cover fabrics are bonded and sewn to form the seam 132 and the cut cylindrical plastic prosthesis (fixed band) is inserted between the outer cover fabrics of the belt body portion 110 part, wherein the belt body portion 110 of the portion in which the belt body portion 110 and the band winding part 120 of the waist fixed band belt 100 are connected is formed in a shape in which a width is reduced, and the waist fixed band belt covers the cat's lumbar vertebrae to act on the lumbosacral joint 1150 formed from the lumbar vertebrae 1140 of the cat's waist part to the rump and is positioned close to the front side surfaces of the thighs of the hind legs. In this case, the fixed band 100a of the waist fixed band belt 100 was manufactured by molding a composition (manufactured by SAMYANG Corporation, product name: TRITEX 3022IR) containing polycarbonate by a known method.

Physical properties of the fixed band 100a of the waist fixed band belt 100 in Embodiment 1 will be described as follows. The fixed band 100a had a tensile strength of 700 kgf/cm² measured based on the ASTM D 638 standard, a flexural strength of 950 kgf/cm² and a flexural modulus of 23,000 kgf/cm² or more measured based on the ASTM D 790 standard, a shrinkage (based on a specimen in a thickness of 3 mm) of 0.5 to 0.7% measured based on the ASTM D 955 standard, a melt index (300° C., 1.2 kg) of 14 g/10 min measured based on the ASTM D 1238 standard, and a heat deflection temperature (HDT) (based on 1.82 MPa (18.6 kgf/cm²) measurement) of 134° C. measured based on the ASTM D 648 standard.

Embodiment 2

There is provided a fixed band belt for treating and caring for a cat including the neck fixed band belt 200 in which the belt body portion 210 having the soft hook-and-loop fastener loops 212 formed on one end portion of an outer side thereof and the band winding part 220 having the rough hook-and-loop fastener hooks 222 formed on an inner side thereof are integrally formed, two sheets of outer cover fabrics are bonded and sewn to form the seam 232, two sheets of fabrics are bonded and sewn between the outer cover fabrics of the belt body portion 210 part, and the cut cylindrical plastic prosthesis is inserted between the outer cover fabrics of the belt body portion 210 part, wherein the belt body portion 210 of the portion in which the belt body portion 210 and the band winding part 220 of the neck fixed band belt 200 are connected is formed in a straight shape having the same width, and the neck fixed band belt 200 covers the cat's lumbar vertebrae and is positioned close to the lower surface of the mandible.

In this case, the fixed band of the neck fixed band belt 200 was manufactured by molding a composition (manufactured by KOLON PLASTICS INC., product name: KOPA KN332G30VOBL) containing 70 wt % of a polyamide 66 resin and 30 wt % of glass fiber by a known method.

Physical properties of the fixed band 100b of the neck fixed band belt 200 in Embodiment 2 will be described as follows. The fixed band 100b had a tensile strength of 1,750 kgf/cm² measured based on the ASTM D 638 standard, a tensile elongation of 4.5%, a flexural strength of 2,800 kgf/cm² and a flexural modulus of 85,000 kgf/cm² measured based on the ASTM D 790 standard, a shrinkage (based on a specimen in a thickness of 3 mm) of 0.3 to 0.7% measured based on the ASTM D 955 standard, a melting point of 255° C. measured based on the ASTM D 1525 standard, and a heat deflection temperature (HDT) (based on 1.82 MPa (18.6 kgf/cm²) measurement) of 240° C. measured based on the ASTM D 648 standard.

Embodiment 3

There is provided a fixed band belt for treating and caring for a cat including the ankle fixed band belt 300 in which the belt body portion 310 having the soft hook-and-loop fastener loops 312 formed on one end portion of an outer side thereof and the band winding part 320 having the rough hook-and-loop fastener hooks 322 formed on an inner side thereof are integrally formed, two sheets of outer cover fabrics are bonded and sewn to form the seam 332, two sheets of fabrics are bonded and sewn between the outer cover fabrics of the belt body portion 310 part, and the cut cylindrical plastic prosthesis is inserted between the outer cover fabrics of the belt body portion 310 part, wherein the belt body portion 310 of the portion in which the belt body portion 310 and the band winding part 320 of the ankle fixed band belt 300 are connected is formed in a straight shape having the same width, and the ankle fixed band belt 300 may cover the ankle joints 1180 of the left and right forelegs. In this case, the fixed bands 100c and 100d of the ankle fixed band belt 300 were manufactured by molding a composition (manufactured by KOLON PLASTICS INC., product name: KOPA KN332G30VOBL) containing 70 wt % of a polyamide 66 resin and 30 wt % of glass fiber by a known method.

The fixed bands 100c and 100d had a tensile strength of 1,750 kgf/cm² measured based on the ASTM D 638 standard, a tensile elongation of 4.5%, a flexural strength of 2,800 kgf/cm² and a flexural modulus of 85,000 kgf/cm² measured based on the ASTM D 790 standard, a shrinkage (based on a specimen in a thickness of 3 mm) of 0.3 to 0.7% measured based on the ASTM D 955 standard, a melting point of 255° C. measured based on the ASTM D 1525 standard, and a heat deflection temperature (HDT) (based on 1.82 MPa (18.6 kgf/cm²) measurement) of 240° C. measured based on the ASTM D 648 standard.

Experimental Example

The fixed band belts manufactured in Embodiments 1 to 3 were respectively fastened to the waist, the neck, and the legs of the cat as illustrated in FIGS. 9 to 11, and the cat's examination (thoracic abdomen examination) was conducted as illustrated in FIG. 12. At this time, when the fixed band belts for fastening in Embodiments 1 to 3 were bent, the prosthesis was not damaged and was restored after inspection.

The structure in which the fixed band belts were fastened to the front portions of the bones of the hind legs based on the belly of the cat's body to allow the cat to lie down comfortably (without movement) during treatment was provided, and it could be seen that the cat could not attack the examiner with its teeth and claws for self-defense during examination.

As can be seen from the above, the reason why the materials of the plastic prostheses inserted into the waist fixed band belt body are different from the materials of the plastic prostheses inserted into the neck and ankle fixed band belt bodies is because breakage occurs when the plastic prosthesis is bent at 180 degrees to cover and sew the plastic prosthesis with the outer cover fabrics because the neck and ankle fixed band belts have small cross-sectional areas, and thus it is necessary to increase flexibility.

INDUSTRIAL APPLICABILITY

The present invention relates to a fixed band belt set for treating and caring for a cat, which allows a veterinarian to easily treat and care for the cat by preventing unexpected accidents caused by the cat attacking the veterinarian with sharp teeth and claws or touching equipment due to mental anxiety of the cat during the cat's treatment or care, and is an industrial applicable invention including the waist fixed band belt 100 in which the belt body portion 110 having the soft hook-and-loop fastener loops 112 formed on one end portion of an outer side thereof and the band winding part 120 having the rough hook-and-loop fastener hooks 122 formed thereon are integrally formed, the cut cylindrical plastic prosthesis is inserted between the outer cover fabrics of the belt body portion 110 part, wherein the ankle fixing ring body 610 of the ankle fixing ring 600 for pets is made of a plastic material having appropriate stiffness and restoring force, and two slipping prevention parts 620 fitted into the ankle fixing ring body 610 are made of a silicone material and have the uneven portions 623 formed thereon toward the contact surface of the ankle, thereby preventing the ankle fixing ring from being separated from the ankle.

The invention claimed is:

1. A fixed band belt set for treating and caring for a cat, comprising a waist fixed band belt in which a belt body portion having soft hook-and-loop fastener loops formed on one end portion of an outer side thereof and a band winding part having rough hook-and-loop fastener hooks formed on an inner side thereof are integrally formed, two sheets of outer cover fabrics are bonded and sewn, and a cut cylindrical plastic prosthesis is inserted between the outer cover fabrics of the belt body portion, wherein a portion of the belt body portion in which the belt body portion and the band winding part of the waist fixed band belt are connected is formed in a shape in which a width is reduced, the waist fixed band belt covers a cat's lumbar vertebrae to act on a lumbosacral joint formed from the lumbar vertebrae of the cat's waist part to a rump and is positioned close to front side surfaces of thighs of hind legs, an anti-attachment member stopper of an anti-attachment member is fitted between a belt body portion end and the hook-and-loop fastener hooks of the waist fixed band belt and wound as an intermediate separator when the waist fixed band belt is wound, and a space for allowing the hook-and-loop fastener hooks of the band winding part to be bonded to the hook-and-loop fastener loops of the belt body portion by forming the anti-attachment member having a shorter length than the waist fixed band belt to form a gap.

\* \* \* \* \*